United States Patent
Kurasawa (10) Patent No.: US 6,842,205 B2
(45) Date of Patent: Jan. 11, 2005

(54) LIQUID CRYSTAL DISPLAY AND ELECTRONIC DEVICE

(75) Inventor: Hayato Kurasawa, Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/678,216

(22) Filed: Oct. 6, 2003

(65) Prior Publication Data

US 2004/0125275 A1 Jul. 1, 2004

(30) Foreign Application Priority Data

Nov. 27, 2002 (JP) ...................................... 2002-343926

(51) Int. Cl.$^7$ .......................................... G02F 1/1335
(52) U.S. Cl. .......................................... 349/96; 349/64
(58) Field of Search .......................... 349/113, 96, 114, 349/61, 64, 106; 359/487, 488, 494, 495, 496, 497

(56) References Cited

U.S. PATENT DOCUMENTS

2003/0025863 A1 * 2/2003 Iijima .......................... 349/122

FOREIGN PATENT DOCUMENTS

| JP | A 5-19208 | 1/1993 |
| JP | A 7-64085 | 3/1995 |
| JP | A 8-87011 | 4/1996 |
| JP | 2000-221324 | * 8/2000 |
| JP | A 2002-365625 | 12/2002 |

OTHER PUBLICATIONS

English Translation of JP 2000–221324, published Aug. 11, 2000, 12 pages.*

* cited by examiner

Primary Examiner—Toan Ton
Assistant Examiner—Tai Duong
(74) Attorney, Agent, or Firm—Oliff & Berridge, PLC (57) ABSTRACT

The invention provides a liquid crystal display, including a transflective film having a PBS array with a satisfactory polarization property, to display a high-contrast image. A liquid crystal display includes an upper substrate and a lower substrate and facing each other, liquid crystal layers disposed between the upper substrate and the lower substrate, an upper polarizing layer disposed above the liquid crystal layers, and a lower reflective polarizing layer disposed below the liquid crystal layers. The lower reflective polarizing layer has a plurality of convex ridges having a triangle wave shape in cross-section and includes a multilayer dielectric film, disposed over the convex ridges, including a plurality of dielectric sub-layers; and the thickness of the multilayer dielectric film disposed on ridgeline portions of the convex ridges is less than or equal to 50% of the height of the convex ridges.

6 Claims, 4 Drawing Sheets

LIQUID CRYSTAL DISPLAY AND ELECTRONIC DEVICE

BACKGROUND OF THE INVENTION

1. Field of Invention

The present invention relates to a liquid crystal display and an electronic device. More particularly, the invention relates to a configuration of a transflective liquid crystal display.

2. Description of Related Art

The related art includes reflective liquid crystal displays that can be used for various portable electronic devices and other devices because such displays do not include a light source, such as a backlight, and therefore have low power consumption. However, in the reflective liquid crystal displays, outside light, such as natural light or artificial light, is used to display an image, and therefore a problem arises that a displayed image cannot be visually identified under dark conditions. Therefore, the related art includes the following display: a liquid crystal display in which outside light is used under light conditions in common with ordinary reflective liquid crystal displays, and an internal light source is used to display an image in a visible manner under dark conditions. That is, this liquid crystal display operates in both reflective and transmissive modes and switches between reflective and transmissive modes depending on the brightness of the environment, whereby a clear image can be displayed under dark conditions while power consumption is saved. This type of liquid crystal display is hereinafter referred to as a "transflective liquid crystal display". A transflective film used for such a transflective liquid crystal display includes, for example, a related art metal film having openings through which light passes and a film, so called a half mirror, having a thickness adjusted such that one part of incident light is reflected and the other part is transmitted.

The related art includes the following splitter: a polarized beam splitter (hereinafter "PBS") that includes a prism and a multilayer dielectric film, disposed thereon, functioning as a semi-transmissive film and has a function of dividing incident light into two linearly polarized beams having polarization directions orthogonal to each other. The related art includes a PBS array, equipped with a plurality of PBSs arranged in an array, functioning as a reflective polarizing film, as disclosed in Japanese Unexamined Patent Application Publication No. 5-19208. Furthermore, the related art includes a liquid crystal display including a liquid crystal panel, a backlight, and such a PBS array disposed therebetween, as disclosed in Japanese Unexamined Patent Application Publication No. 7-64085. According to such a liquid crystal display, light emitted from the backlight is divided into two linearly polarized beams with the PBS array, one is transmitted to the liquid crystal panel, and the other is reflected toward the backlight such that the reflected beam is used together with light emitted from the backlight, thereby achieving high light-utilization efficiency.

SUMMARY OF THE INVENTION

The above PBS array can be used as a transflective film for liquid crystal displays.

In a liquid crystal display including the PBS array disposed between liquid crystal layers and a backlight, outside light incident on an upper substrate is transmitted through each liquid crystal layer while the polarization mode is changed, and the transmitted light arrives at the PBS array. The arriving light is divided into two linearly polarized beams with the PBS array, one is reflected back to the upper substrate, and the other is transmitted through the PBS array, thereby displaying a gray-scale image in a reflective mode. Alternatively, a linearly polarized beam of light emitted from the backlight is transmitted through the PBS array, and the transmitted light is used to display an image and then transmitted through the liquid crystal layer while the polarization mode is changed, thereby displaying a gray-scale image in a transmissive mode.

According to this liquid crystal display, when outside light or the backlight is used for display purposes, transformation between circular and linear polarization is not caused. Thus, light loss due to the transformation is small and therefore a relatively bright image can be displayed.

However, when the PBS array having the multilayer dielectric film is used as the transflective film, the following problem occurs.

Figure 5:
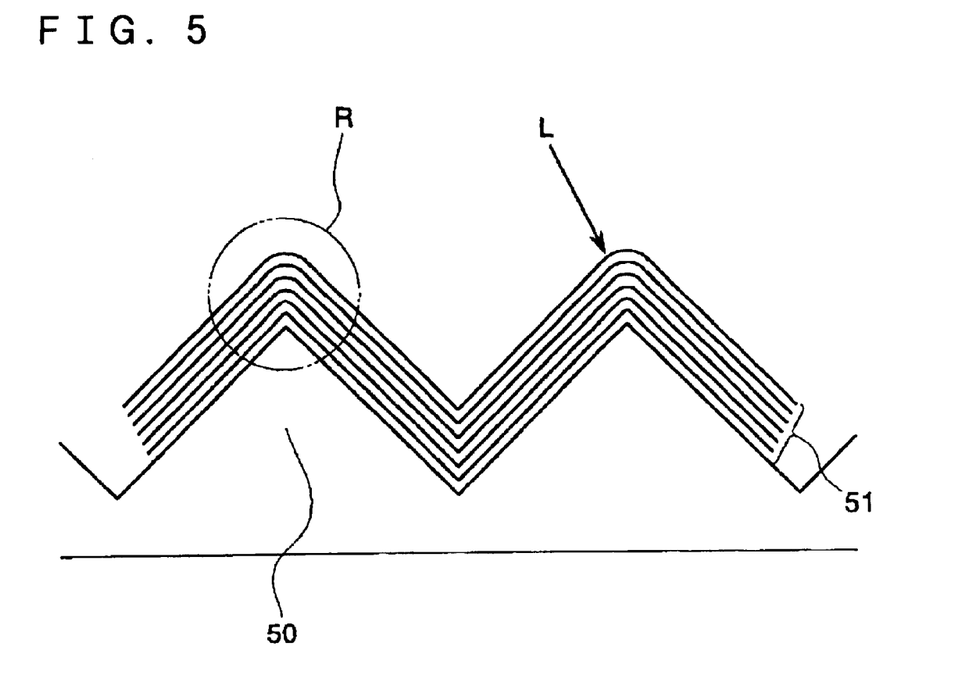
FIG. 5 is a schematic showing a problem caused in a related art reflective polarizing layer.

The PBS array is prepared according to the following procedure: for example, a base material layer that functions as a base and contains a resin or the like is formed on a substrate, a large number of convex ridges that have a trigonal prism shape and function as prisms are formed on the base material layer, and a multilayer dielectric film is formed along each slope of the convex ridges. In this type of transflective film, the polarization property, which is one of the optical properties thereof, greatly depends on the incident angle of light incident on the multilayer dielectric film. Therefore, the multilayer dielectric film is preferably formed in parallel to each slope of the convex ridges, having an optimum trigonal prism shape, in a precise manner such that ridgelines (top portions) of the convex ridges have a sharp shape. However, in actuality, as shown in FIG. 5, portions of the multilayer dielectric film 51 disposed in the vicinities of the ridgelines of the convex ridges 50 have a round shape, as indicated in circle R, and therefore have a radius of curvature substantially equal to the thickness of the multilayer dielectric film 51. That is, at these portions, the multilayer dielectric film 51 is not parallel to each slope, and the portions do not have a sharp shape. Therefore, at the portions, an ideal polarization property is not achieved. Furthermore, portions of the multilayer dielectric film 51 disposed in the vicinities of the ridgelines of the convex ridges 50 do not have a flat surface and therefore do not have a function of polarizing light that is incident in a slanting direction. That is, these portions are useless regions. An increase in thickness of the multilayer dielectric film 51 expands such useless regions disposed in a limited area. Such deterioration in polarization property causes liquid crystal displays to display low-contrast images.

In order to address or solve the above, the present invention provides a liquid crystal display, including a transflective film having a PBS array with satisfactory polarization properties, to display a high-contrast image.

In order to address or achieve the above, a liquid crystal display of the present invention includes an upper and a lower substrate facing each other, liquid crystal layers disposed between the upper and lower substrates, an upper polarizing layer disposed above the liquid crystal layers, and a lower reflective polarizing layer disposed below the liquid crystal layers. The lower reflective polarizing layer has a plurality of convex ridges having a triangle wave shape in cross-section and includes a multilayer dielectric film, disposed over the convex ridges, including a plurality of dielectric sub-layers. The thickness of the multilayer dielectric film disposed on ridgelines of the convex ridges is less than or equal to 50% of the height of the convex ridges.

The liquid crystal display of the present invention is one of transflective liquid crystal displays including a transflective film, which corresponds to the lower reflective polarizing layer (so-called PBS array-type reflective polarizing film) including the multilayer dielectric film, disposed over a plurality of the convex ridges having a triangle wave shape in cross-section. The multilayer dielectric film has a relatively small thickness such that the thickness of the multilayer dielectric film is less than or equal to 50% of the height of the convex ridges. The height is defined as the distance between the ridgeline portions (top portions) and bottom of the convex ridges(hereinafter simply referred to as the height of the convex). According to this configuration, portions of the multilayer dielectric film disposed in the vicinities of the ridgelines of the convex ridges do not have a round shape but have a sharp shape and dielectric sub-layers are arranged in parallel to each other up to portions close to the ridgelines. Therefore, the polarization property is prevented from being deteriorated in the vicinities of the ridgelines, thereby achieving liquid crystal displays for displaying high-contrast images. The basis of the following limitation is described in section "Examples" in detail: the thickness of the multilayer dielectric film is less than or equal to 50% of the height of the convex ridges. It is not correct that the multilayer dielectric film thickness is not limited if the multilayer dielectric film thickness is less than or equal to 50% of the convex ridge height. It is not easy to limit the multilayer dielectric film thickness even though the ratio of the multilayer dielectric film thickness to the convex ridge height is limited. In order to function as a reflective polarizing layer, the multilayer dielectric film must have a thickness of at least 300 nm.

In particular, the lower substrate includes a base material film, disposed above the lower substrate, to form a plurality of the convex ridges and the multilayer dielectric film is disposed on the base material film.

According to this configuration, the base material layer may contain a thermosetting or photocurable resin, such as an acrylic resin, and functions as the base of the multilayer dielectric film. Thereby, the lower reflective polarizing layer can be readily formed and the size and shape of the convex ridges can be readily controlled.

In the liquid crystal display of the present invention, the number of the dielectric sub-layers is preferably seven or less.

When the PBS array is usually prepared, for example, a resin is used for the base material layer and the convex ridges are formed such that the height thereof is 0.5 to 3 $\mu$m. It is technically difficult to form such convex ridges having a height of less than 0.5 $\mu$m. When the height is more than 3 $\mu$m, defects, such as bubbles, are caused in the base material layer having an excessively large thickness, thereby deteriorating the reliability. On the other hand, each dielectric sub-layer must have a thickness of 10 to 100 nm. Therefore, when the number of the dielectric sub-layers is eight or more, the following condition, which is characteristic of the present invention, cannot be satisfied in some cases: the multilayer dielectric film thickness is less than or equal to 50% of the height of the convex ridge.

The liquid crystal display preferably further includes a scattering film, disposed above the lower reflective polarizing layer, to scatter light reflected by the lower reflective polarizing layer.

According to this configuration, the light reflected by the lower reflective polarizing layer locally has a high intensity, whereby the visibility of an image displayed in a reflective mode can be prevented from being deteriorated. Thus, a bright image can be achieved at a wide viewing angle to a certain extent. The scattering film is disposed above at least the lower reflective polarizing layer. A front scattering film functioning as the scattering film may be disposed above the upper substrate or the scattering film is disposed may be between the upper and lower substrates.

The liquid crystal display may further include a color filter disposed inner side of the upper substrate or the lower substrate.

According to this configuration, a transflective color liquid crystal display can be achieved. The color filter may be disposed below the upper substrate or above the lower reflective polarizing layer placed at a position close to the lower substrate. The color filter placed just above the lower reflective polarizing layer reduces or prevents color misalignment and parallax, thereby displaying a clear color image.

An electronic device of the present invention includes the liquid crystal display of the present invention.

According to this configuration, electronic devices having a display section for displaying a high-contrast image can be achieved.

DETAILED DESCRIPTION OF PREFERRED EMBODIMENTS

An exemplary embodiment of the present invention is described below with reference to FIGS. 1 to 3(b).

Figure 1:
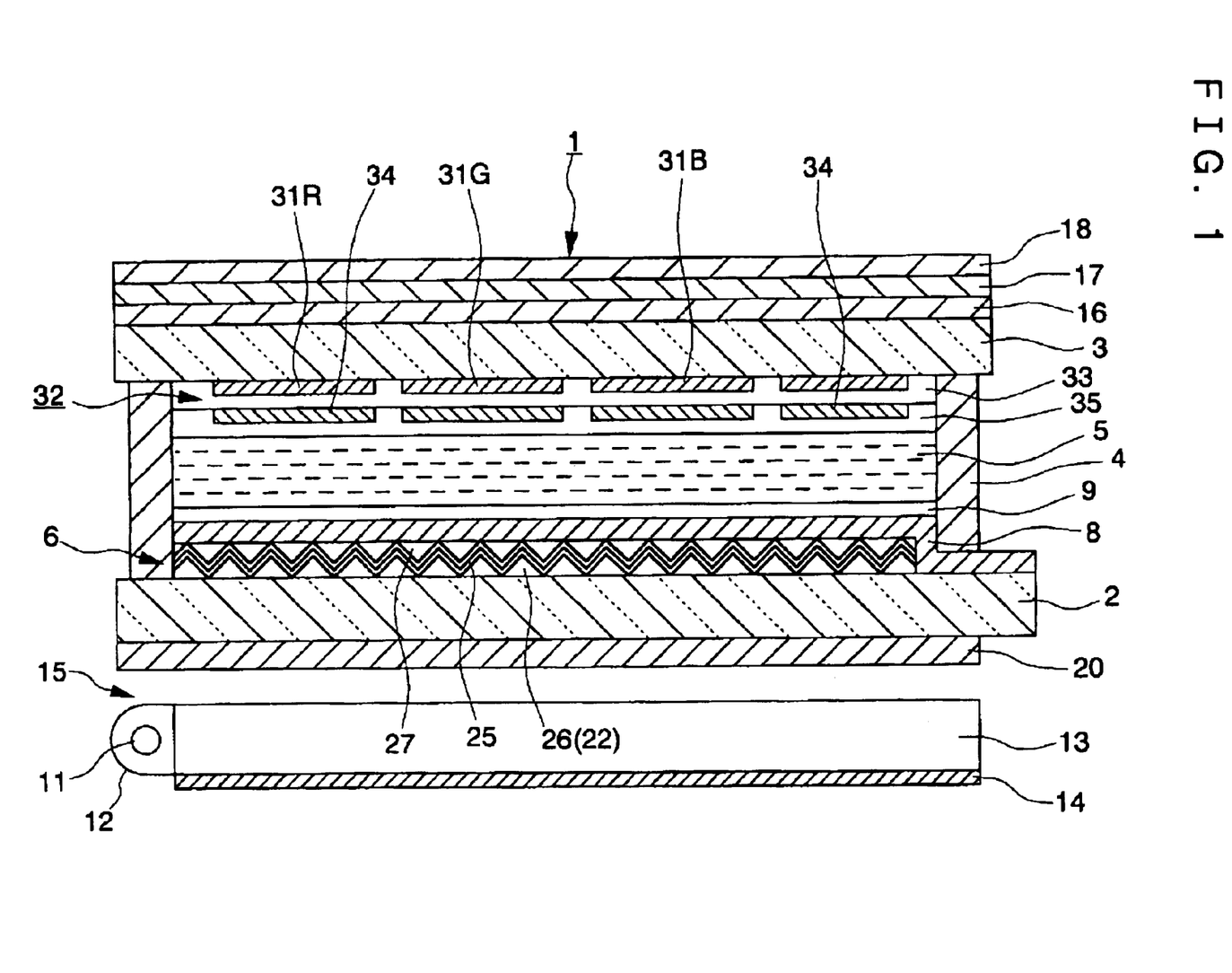
FIG. 1 is a sectional view showing a liquid crystal display of an exemplary embodiment of the present invention.

FIG. 1 is a sectional view showing a configuration of a liquid crystal display of this exemplary embodiment. This display is an example of a transflective color liquid crystal display, which is of a passive matrix type. In the following drawings, in order to provide a clear understanding of the drawings, different scales are used to facilitate viewability of the members.

As shown in FIG. 1, the liquid crystal display 1 of this exemplary embodiment includes a lower substrate 2, an upper substrate 3, a sealing member 4, and liquid crystal layers 5 containing a super twisted nematic (STN) liquid crystal. The lower and upper substrates 2 and 3 face one another. Portions, partitioned with the sealing member 4, lying between the lower and upper substrates 2 and 3 each act as an liquid crystal cell that contains each liquid crystal layer 5.

The lower substrate 2 includes a transparent material, such as glass or a resin, and has a lower reflective polarizing layer 6, described below, thereon. Scanning electrodes 8 containing a transparent conductive material, such as indium tin oxide (hereinafter "ITO"), are arranged on the lower reflective polarizing layer 6 in a striped pattern and extend from side to side. A first alignment layer 9 containing polyimide or the like is disposed over the scanning electrodes 8. The lower substrate 2 has a lower polarizing film 20 thereunder. A backlight (lighting device) 15 including the following components is disposed below the lower polarizing film 20: a light source 11, a reflector 12, a light-guiding plate 13, and a reflective film 14.

Figure 2:
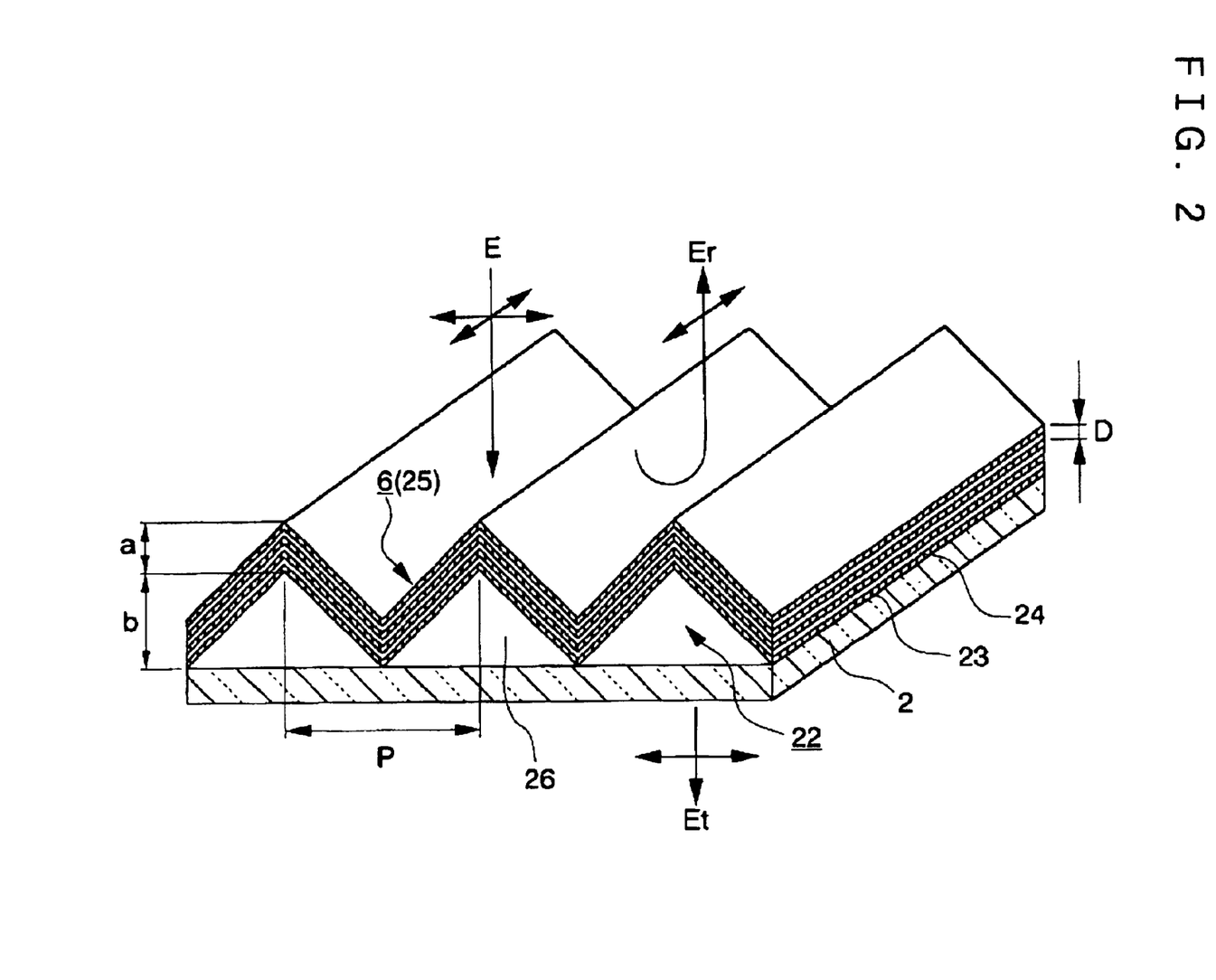
FIG. 2 is a sectional view showing a lower reflective polarizing layer of the liquid crystal display.
Figure 3:
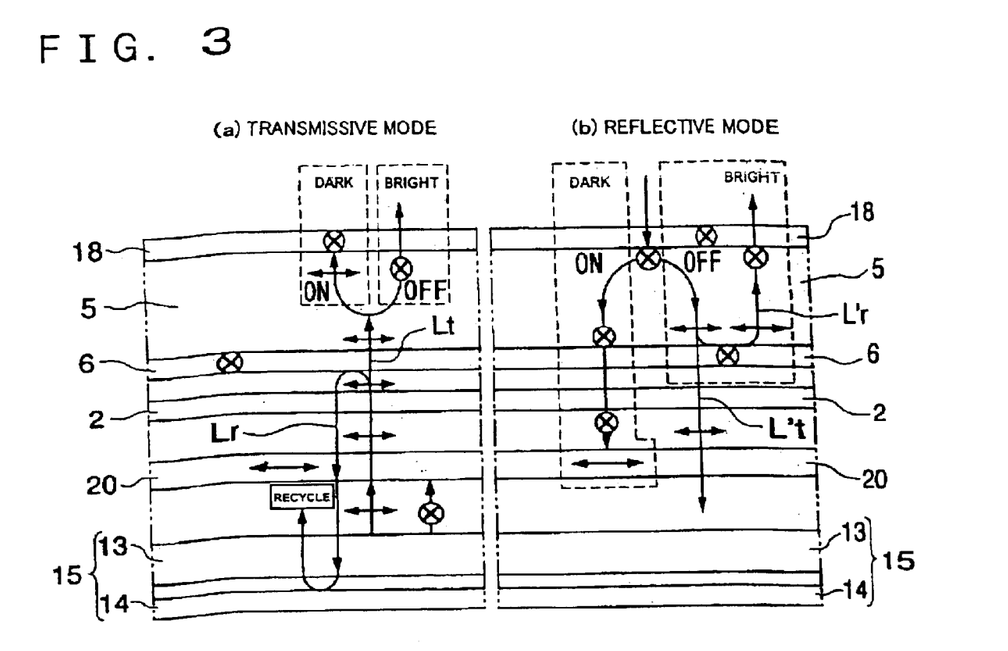
FIGS. 3(a) and 3(b) are schematics showing the operational principle of the liquid crystal display.

As shown in FIG. 2, the lower reflective polarizing layer 6 includes a base material film 22, disposed on the lower substrate 2, containing a thermosetting or photocurable transparent resin, such as an acrylic resin; and a multilayer dielectric film 25 including a plurality of first and second dielectric sub-layers 23 and 24 disposed in a stacked manner. The base material film 22 has a plurality of convex ridges 26 having two slopes and a trigonal prism shape (prism shape). A plurality of the convex ridges 26 are periodically arranged and have a triangular wave shape in cross-section. In the multilayer dielectric film 25, the first and second dielectric sub-layers 23 and 24 containing two types of materials having different refractive indexes are alternatively arranged along the slopes of the convex ridges 26 (that is, the multilayer dielectric film 25 is a so-called three-dimensional photonic crystal layer). In this exemplary embodiment, the multilayer dielectric film 25 includes seven $TiO_2$ and $SiO_2$ sub-layers in total. As shown in FIG. 1, the multilayer dielectric film 25 is covered with a resin layer 27. Such a photonic crystal layer including sub-layers having a prism shape has anisotropy in light propagation property. Therefore, as shown in FIG. 2, when natural light E is incident on the multilayer dielectric film 25, a linearly polarized beam Er parallel to such a direction that the convex ridges 26 extend is reflected and another linearly polarized beam Et perpendicular to such a direction that the convex ridges 26 extend is transmitted through the multilayer dielectric film 25. That is, the lower reflective polarizing layer 6 shown in FIG. 2 has a reflective axis parallel to the direction that the convex ridges 26 extend and a transmissive axis perpendicular to the direction that the convex ridges 26 extend.

The first and second dielectric sub-layers 23 and 24 included in the multilayer dielectric film 25 each have a thickness of about 10 to 100 nm and the multilayer dielectric film 25 has a thickness of about 300 nm to 1 $\mu$m. The convex ridges 26 have a height of 0.5 to 3 $\mu$m. Furthermore, the condition a/b$\leq$0.5 is satisfied, where a represents the local thickness of the multilayer dielectric film 25 disposed on each ridgeline portion of the convex ridges 26 and b represents the height of the convex ridges 26. That is, the local thickness a of the multilayer dielectric film 25 disposed on the ridgeline portion is less than or equal to 50% of the height b of the convex ridges 26. The pitch between the convex ridges 26 is about 1 to 6 $\mu$m. Materials for the first and second dielectric sub-layers 23 and 24 include $Ta_2O_5$ and Si in addition to $TiO_2$ and $SiO_2$. The following pitches may be each adjusted to corresponding approximate values depending on the desired properties of the lower reflective polarizing layer 6: the layer pitch D between the first and second dielectric sub-layers 23 and 24 and the ridge pitch P between the convex ridges 26. For example, the reflectivity (transmissivity) of the lower reflective polarizing layer 6 having the above configuration can be controlled by varying the number of the first and second dielectric sub-layers 23 and 24. That is, a decrease in number of the sub-layers enhances the transmissivity of a linearly polarized beam parallel to the reflective axis (parallel to the direction that the convex ridges 26 extend) and reduces the reflectivity thereof. When the number of the sub-layers exceeds a predetermined value, the linearly polarized beam parallel to the reflective axis is almost reflected.

On the other hand, the upper substrate 3 contains a transparent material, such as glass or a resin, and red, green, and blue coloring material layers 31R, 31G, and 31B, are horizontally arranged under the upper substrate 3 in a repeated manner in that order. The red, green, and blue coloring material layers 31R, 31G, and 31B extend perpendicular to the plane of the figure such that each of the red, green, and blue coloring material layers 31R, 31G, and 31B and each scanning electrode 8 cross at right angles. A planarizing layer 33 is placed under the upper substrate 3 so as to cover an irregular surface due to the red, green, and blue coloring material layers 31R, 31G, and 31B. The planarizing layer 33 and the red, green, and blue coloring material layers 31R, 31G, and 31B form a color filter 32. Signal electrodes 34 containing a transparent conductive material, such as ITO, are arranged under the planarizing layer 33 in a striped pattern. The signal electrodes 34 extend perpendicular to the plane of the figure. A second alignment layer 35 containing polyimide or the like is disposed under the signal electrodes 34. A front scattering film 16, a retardation film 17, and an upper polarizing film 18 are arranged on the upper substrate 3 in that order.

The operational principle of the liquid crystal display having the above configuration is described below. FIGS. 3(a) and 3(b) are schematics showing the operational principle of the liquid crystal display of this exemplary embodiment. FIG. 3(a) is a schematic showing a path of light propagated in a transmissive mode, and FIG. 3(b) is a schematic showing a path of light propagated in a reflective mode. In these figures, among elements of the liquid crystal display, only elements used for description are shown. The liquid crystal layers 5 are placed between the upper polarizing film 18 and the lower reflective polarizing layer 6. The lower substrate 2 is placed under the lower reflective polarizing layer 6. The lower polarizing film 20 is placed under the lower substrate 2. The light-guiding plate 13 of the backlight 15 is placed below the lower polarizing film 20 and the reflective film 14 is placed below the light-guiding plate 13.

The upper polarizing film 18 has a transmissive axis perpendicular to the plane of the figure and the lower polarizing film 20 has a transmissive axis parallel to the plane of the figure. The lower reflective polarizing layer 6, which is of a transflective type, has a transmissive axis perpendicular to the plane of the figure and a reflective axis orthogonal to the transmissive axis. In the lower reflective polarizing layer 6, most of a polarized beam parallel to the transmissive axis is transmitted and the remainder is reflected, and most of a polarized beam parallel to the reflective axis is reflected and the remainder is transmitted. That is, for the polarized beam parallel to the reflective axis, the lower reflective polarizing layer 6 has a transflective function. The lower reflective polarizing layer 6 has the same configuration as that shown in FIG. 2 and the transmissive axis thereof is perpendicular to the plane of FIGS. 3(a) and 3(b). That is, the convex ridges 26 of the lower reflective polarizing layer 6 shown in FIG. 2 extend in parallel to the plane of FIGS. 3(a) and 3(b).

A method for displaying an image in the transmissive mode shown in FIG. 3(a) is described below.

In the liquid crystal display 1 of this exemplary embodiment, an image is displayed in the transmissive mode using light emitted from the backlight 15. A light beam emitted from the backlight 15 is transformed into a linearly polarized beam parallel to the plane of the figure with the lower polarizing film 20 having a transmissive axis parallel to the plane of the figure. The linearly polarized beam is transmitted through the lower substrate 2 and then incident on the lower reflective polarizing layer 6. Since the lower reflective polarizing layer 6 has the transmissive axis perpendicular to the plane of the figure, as described above, one part of the linearly polarized beam, which has been transformed with the lower polarizing film 20 and is parallel to the plane of the figure, is reflected and returns to the lower polarizing film 20. This part is referred to as a first reflected beam Lr. The other part is transmitted through the lower reflective polarizing layer 6 and enters each liquid crystal layer 5. This part is referred to as a first transmitted beam Lt.

When a voltage is applied to the liquid crystal layer 5, that is, when the liquid crystal layer 5 is turned on, the first transmitted beam Lt entering the liquid crystal layer 5 arrives at the upper polarizing film 18 without being affected by the liquid crystal layer 5 and is then absorbed by the upper polarizing film 18, thereby rendering a pixel dark. In contrast, when a voltage is not applied to the liquid crystal layer 5, that is, when the liquid crystal layer 5 is turned off, the first transmitted beam Lt entering the liquid crystal layer 5 is transformed into a linearly polarized beam perpendicular to the plane of the figure by the effects of the optical rotation and birefringence of the liquid crystal layer 5 and this linearly polarized beam arrives at the upper polarizing film 18. The linearly polarized beam parallel to the transmissive axis of the upper polarizing film 18 is transmitted through the upper polarizing film 18, thereby rendering the pixel bright.

The first reflected beam Lr reflected by the back face of the lower reflective polarizing layer 6, which is disposed at a position close to the lower substrate 2, is described below. The first reflected beam Lr is transmitted through the lower substrate 2 and the lower polarizing film 20 and then returns to the backlight 15. The resulting first reflected beam Lr is reflected by the reflective film 14 disposed on the side close to the outside and then recycled into a beam propagated toward the lower polarizing film 20. The resulting beam arrives at the lower reflective polarizing layer 6 again. One part of the resulting beam is transmitted through the lower reflective polarizing layer 6 and then enters the liquid crystal layer 5, and the other part is reflected by the lower reflective polarizing layer 6 and then returns to the backlight 15. The beam reflected by the lower reflective polarizing layer 6 is transmitted through the lower reflective polarizing layer 6 while this beam is repeatedly reflected between the lower reflective polarizing layer 6 and the reflective film 14, and the resulting beam is then used for displaying an image. Thus, in the liquid crystal display 1 of this exemplary embodiment, among beams emitted from the backlight 15, a beam transmitted through the lower polarizing film 20 can be fully used, thereby displaying a bright image.

A method for displaying an image in the reflective mode shown in FIG. 3(b) is described below.

As shown in FIG. 3(b), a light beam incident on the upper polarizing film 18 is transformed into a linearly polarized beam with the upper polarizing film 18 having a transmissive axis perpendicular to the plane of the figure and this linearly polarized beam enters the liquid crystal layers 5. If the liquid crystal layer 5 is turned on, the entering beam arrives at the lower reflective polarizing layer 6 without being affected by the liquid crystal layer 5. Since the lower reflective polarizing layer 6 has a transmissive axis perpendicular to the plane of the figure and a reflective axis parallel to the plane of the figure, the beam arriving at the lower reflective polarizing layer 6 is transmitted through the lower reflective polarizing layer 6. The resulting beam is further transmitted through the lower substrate 2 and then absorbed by the lower polarizing film 20 having a transmissive axis parallel to the plane of the figure, thereby rendering a pixel dark.

In contrast, if the liquid crystal layer 5 is turned off, the beam entering the liquid crystal layer 5 is transformed into a linearly polarized beam parallel to the plane of the figure by the effects of the optical rotation and birefringence of the liquid crystal layer 5, and this linearly polarized beam arrives at the lower reflective polarizing layer 6. One part of the resulting linearly polarized beam is reflected by the lower reflective polarizing layer 6 having a reflective axis parallel to the plane of the figure and this part is referred to as a second reflected beam L'r. The other part is transmitted through the lower reflective polarizing layer 6 and this part is referred to as a second transmitted beam L't.

The second reflected beam L'r entering the liquid crystal layer 5 again is transformed into a linearly polarized beam perpendicular to the plane of the figure by the effects of the optical rotation and birefringence of the liquid crystal layer 5, and this linearly polarized beam is transmitted through the upper polarizing film 18, thereby rendering the pixel bright. The second transmitted beam L't transmitted through the lower reflective polarizing layer 6 is further transmitted through the lower substrate 2 and the lower polarizing film 20 and then emitted toward the backlight 15. Since the backlight 15 has the reflective film 14, part of the second transmitted beam L't is reflected by the reflective film 14 and then returns to the lower substrate 2. Since the brightness of the pixel rendered bright is enhanced when the returning beam enters the liquid crystal layer 5, the second transmitted beam L't transmitted through the lower reflective polarizing layer 6 does not affect a displayed image.

In the liquid crystal display 1 of this exemplary embodiment, the multilayer dielectric film 25 has a relatively small thickness such that the thickness of the multilayer dielectric film 25 is less than or equal to 50% of the height of the convex ridges 26 of the lower reflective polarizing layer 6. Convex ridges of related art multilayer dielectric films have gentle ridgelines. However, according to the above configuration, the convex ridges 26 of the multilayer dielectric film 25 have sharp ridgeline portions and the first and second dielectric sub-layers 23 and 24 are arranged in parallel to each other even in the vicinities of the sharp ridgeline portions. That is, the lower reflective polarizing layer 6 has less useless regions as compared with related art reflective polarizing layers. As a result, in the vicinities of the ridgeline portions of the convex ridges 26, the polarizing property is prevented from being deteriorated, thereby obtaining liquid crystal displays to display a high-contrast image.

As shown in FIGS. 3(a) and 3(b), in the liquid crystal display 1 of this exemplary embodiment, the liquid crystal layer 5 is turned off when a bright image is displayed in a transmissive or reflective mode, and the liquid crystal layer 5 is turned on when a dark image is displayed in a transmissive or reflective mode. That is, the voltage application mode of the liquid crystal layer 5 to display an image in a transmissive mode is the same as the voltage application mode of the liquid crystal layer 5 to display an image in a reflective mode when the images are both dark or bright. Whereby, image contrast can be prevented from being lowered due to incident light coming from the outside, thereby displaying an image that is excellent in visibility. The reason for this is as follows. If the voltage application mode of the liquid crystal layer 5 to display an image in a transmissive mode is different from the voltage application mode of the liquid crystal layer 5 to display an image in a reflective mode when the images are both dark or bright, the voltage application mode of the liquid crystal layer 5 to display a dark image in a transmissive mode is the same as the voltage application mode of the liquid crystal layer 5 for displaying a bright image in a reflective mode. Thus, when outside light enters the liquid crystal display 1 operating in a transmissive mode, a beam reflected by the lower reflective polarizing layer 6 is emitted outside each pixel used for displaying a dark image, thereby rendering the pixel, which must be dark, bright. Thus, the contrast of a displayed image is deteriorated.

In the liquid crystal display 1 of this exemplary embodiment, in the case of displaying an image in a reflective mode, a beam transmitted through the lower reflective polarizing layer 6 is absorbed by the lower polarizing film 20, thereby rendering the pixels dark. Since the transmissive axis of the lower reflective polarizing layer 6 and the transmissive axis of the lower polarizing film 20 cross at right angles, the beam transmitted through the lower reflective polarizing layer 6 is almost completely absorbed by the lower polarizing film 20 and therefore a darker image can be displayed, thereby enhancing the contrast of an image displayed in a reflective mode. Thus, a clear image can be obtained.

Since the front scattering film 16 for scattering a beam reflected by the lower reflective polarizing layer 6 is placed on the upper substrate 3, the beam reflected by the lower reflective polarizing layer 6 locally has a high intensity and therefore the visibility of an image displayed in a reflective mode can be prevented from being deteriorated, thereby achieving a bright image at a wide viewing angle to a certain extent. The front scattering film 16 may be placed at a position upper than at least the lower reflective polarizing layer 6 and my be placed between the lower and upper substrates 2 and 3.

[Exemplary Electronic Device]

An example of an electronic device including the liquid crystal display 1 of the above exemplary embodiment is described below.

Figure 4:
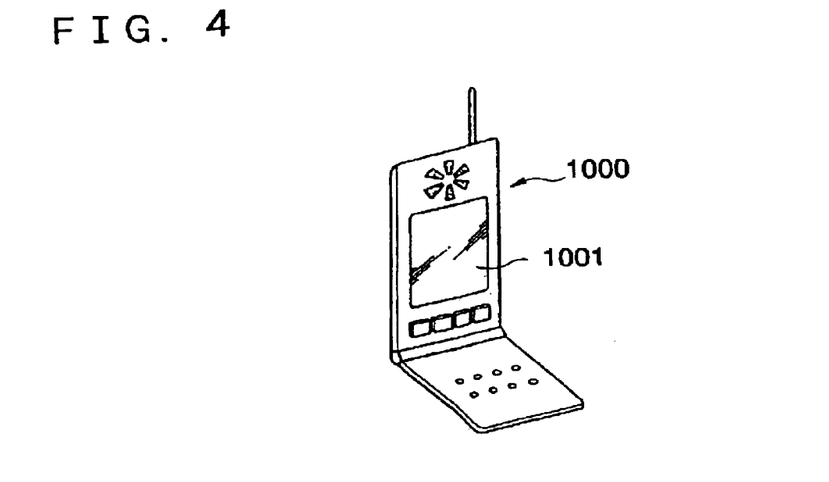
FIG. 4 is a perspective view showing an exemplary embodiment of an electronic device according to the present invention.

FIG. 4 is a perspective view showing an example of a mobile phone. In this figure, reference numeral 1000 represents a mobile phone body and reference numeral 1001 represents a liquid crystal display section including the above liquid crystal display 1.

Since the mobile phone shown in FIG. 4 includes the liquid crystal display section including the above liquid crystal display 1, an image that is excellent in visibility can be displayed in a transmissive or reflective mode.

The present invention is not limited to the above exemplary embodiments. Various modifications may be made within the scope of the present invention. For example, in the above exemplary embodiments, the following configuration is illustrated: the base material film 22 containing a thermosetting or photocurable transparent resin have a triangular wave shape in cross-section and is placed on the lower substrate 2, and the lower reflective polarizing layer 6 includes the base material film 22 and the first and second dielectric sub-layers 23 and 24 disposed on the base material film 22. However, the lower reflective polarizing layer 6 may be directly processed by an etching process such that a plurality of the convex ridges 26 are formed, and first and second dielectric sub-layers 23 and 24 may be placed on the convex ridges 26 such that the lower reflective polarizing layer 6 is formed. For various components of the liquid crystal display 1, the shape, the material, and the arrangement are not limited to the above exemplary embodiments and may be modified according to needs.

EXAMPLES

Example 1

In order to confirm advantages of the present invention, the inventors have conducted experiments. Experiment results are described below.

Samples of a liquid crystal display, including a reflective polarizing layer having a multilayer dielectric film, according to an exemplary embodiment of the present invention was prepared. The degree of polarization of the reflective polarizing layer was measured and the display quality of images was evaluated. Convex ridges of all the samples have a height of 1.5 μm. In Sample 1, the multilayer dielectric film includes seven dielectric sub-layers and has a thickness of 604.3 nm, and the thickness of the multilayer dielectric film is about 40% of the height of the convex ridges. In Sample 2, the multilayer dielectric film includes seven dielectric sub-layers and has a thickness of 707.5 nm, and the thickness of the multilayer dielectric film is about 47% of the height of the convex ridges. In Comparative Sample 1, the multilayer dielectric film includes seven dielectric sub-layers and has a thickness of 846.3 nm, and the thickness of the multilayer dielectric film is about 56% of the height of the convex ridges. In Comparative Sample 2, the multilayer dielectric film includes nine dielectric sub-layers and has a thickness of 1,053.3 nm, and the thickness of the multilayer dielectric film is about 70% of the height of the convex ridges. The thickness of the multilayer dielectric film of each sample is shown in Table 1, and the evaluation results are shown in Table 2.

"The degree of polarization of the reflective polarizing layer" is defined by the following equation (1):

$$Dp=(Tt-Tr)/(Tt+Tr) \tag{1}$$

where Dp represents the degree of polarization of the reflective polarizing layer; Tr represents the transmissivity of a linearly polarized beam, parallel to the reflective axis of the reflective polarizing layer, perpendicularly entering the reflective polarizing layer; and Tt represents the transmissivity of a linearly polarized beam, parallel to the transmissive axis of the reflective polarizing layer, perpendicularly entering the reflective polarizing layer.

For the measurement of polarization, polarization spectroscopy was employed and the measuring procedure is as follows: a linearly polarized beam is applied to each sample such that the beam forms a predetermined angle with an optical axis of the sample and a beam transmitted therethrough is then detected. The display quality was evaluated by measuring and visually checking the brightness of an image displayed in a transmissive or reflective mode.

TABLE 1

| Layer Material | Thickness (mm) | | | |
| --- | --- | --- | --- | --- |
| | Sample 1 | Sample 2 | Comparative Sample 1 | Comparative Sample 2 |
| TiO$_2$ | 36.5 | 37.3 | 90.5 | 179.3 |
| SiO$_2$ | 91.6 | 87.4 | 26.8 | 153.3 |
| TiO$_2$ | 55.6 | 67.6 | 89.3 | 130.4 |
| SiO$_2$ | 94.2 | 105.1 | 246.6 | 114.1 |
| TiO$_2$ | 85.9 | 120.0 | 100.1 | 78.3 |
| SiO$_2$ | 148.0 | 170.6 | 169.6 | 123.9 |
| TiO$_2$ | 92.5 | 119.5 | 123.4 | 78.3 |
| SiO$_2$ | | | | 97.8 |
| TiO$_2$ | | | | 97.8 |

TABLE 1-continued

| | Thickness (mm) | | | |
|---|---|---|---|---|
| Layer Material | Sample 1 | Sample 2 | Comparative Sample 1 | Comparative Sample 2 |
| Total Thickness | 604.3 | 707.5 | 846.3 | 1053.3 |
| R*1 | 40% | 47% | 56% | 70% |

*1R represents the ratio of the total thickness of the multilayer dielectric film to the height of the convex ridges.

TABLE 2

| Sample | Polarization Degree of reflective polarizing layer | Displayed Image |
|---|---|---|
| Sample 1 | 62% | Bright and high contrast in a reflective mode |
| Sample 2 | 58% | High contrast |
| Comparative Sample 1 | 42% | Low contrast and insufficient quality |
| Comparative Sample 2 | 31% | Dark in reflective and transmissive modes and low contrast in a reflective mode |

As shown in Table 2, in Comparative Sample 1 in which the ratio of the total thickness of the multilayer dielectric film to the height of the convex ridges is 56%, the reflective polarizing layer has a polarization degree of 42%. In Comparative Sample 2 in which the ratio of the total thickness of the multilayer dielectric film to the height of the convex ridges is 70%, the reflective polarizing layer has a polarization degree of 31%. In contrast, in Sample 1 in which the ratio of the total thickness of the multilayer dielectric film to the height of the convex ridges is 40%, the reflective polarizing layer has a polarization degree of 62%. In Sample 2 in which the ratio of the total thickness of the multilayer dielectric film to the height of the convex ridges is 47%, the reflective polarizing layer has a polarization degree of 58%. That is, in Samples 1 and 2 in which the ratio of the total thickness of the multilayer dielectric film to the height of the convex ridges is 50% or less, the reflective polarizing layers are more satisfactory in polarization property as compared with those of Comparative Samples 1 and 2. For the evaluation of the display quality, in Comparative Samples 1 and 2, images displayed in a reflective mode and displayed in a transmissive mode are dark and the contrast of the images displayed in a reflective mode is low. In contrast, in Samples 1 and 2, images, particularly displayed in a reflective mode, are bright and the contrast of the images is high.

Example 2

The polarization property of reflective polarizing layers including convex ridges having different heights was evaluated.

Sample 1 including convex ridges having a height of 1.5 $\mu$m was used, where other components of Sample 1 are as described above. Comparative Sample 3 including convex ridges having a height of 0.8 $\mu$m was prepared, where other components of Comparative Sample 3 are the same as those of Sample 1. Evaluation results are shown in Table 3.

TABLE 3

| | Height of Convex Ridges ($\mu$m) | R*2 | Dp*3 | Displayed Image |
|---|---|---|---|---|
| Sample 1 | 1.5 | 40% | 62% | Bright and high contrast in a reflective mode |
| Comparative Sample 3 | 0.8 | 76% | 29% | Dark and low contrast in a reflective mode |

*2R represents the ratio of the total thickness of the multilayer dielectric film to the height of the convex ridges.
*3Dp represents the polarization degree of the reflective polarizing layer.

As shown in Table 3, in Comparative Sample 3 in which the ratio of the total thickness of the multilayer dielectric film to the height of the convex ridges is 76%, the reflective polarizing layer has a polarization degree of 29%. In contrast, in Sample 1 in which the ratio of the total thickness of the multilayer dielectric film to the height of the convex ridges is 40%, the reflective polarizing layer has a polarization degree of 62%. That is, although the multilayer dielectric films of these samples have the same thickness, the multilayer dielectric film of the Sample 1 in which the ratio of the total thickness of the multilayer dielectric film to the height of the convex ridges is smaller is more satisfactory in polarization property as compared with that of Comparative Sample 3. For the evaluation of the display quality, in Comparative Sample 3, an image displayed in a reflective mode is dark and the contrast of the image is low. In contrast, in Sample 1, an image displayed in a reflective mode is bright and the contrast of the image is high.

According to the results of Examples 1 and 2, the reflective polarizing layer including the multilayer dielectric film having a smaller thickness has a polarization property more satisfactory than that of the reflective polarizing layer including the multilayer dielectric film having a larger thickness when these reflective polarizing layers include the convex ridges having the same height. Furthermore, even if the multilayer dielectric films have the same thickness, the multilayer dielectric films have different polarization properties when the convex ridges have different heights. That is, the reflective polarizing layer including the higher convex ridges has a polarization property more satisfactory than that of the reflective polarizing layer including the lower convex ridges. This is because useless portions, positioned near ridgeline portions of the convex ridges, having no polarization function form a larger proportion of the multilayer dielectric film including the lower convex ridges and therefore the multilayer dielectric film has a smaller polarization property, even though this multilayer dielectric film has the same thickness as that of the other multilayer dielectric film. That is, the polarization property of the reflective polarizing layer depends on the ratio of the thickness of the multilayer dielectric film to the height of the convex ridges. Thus, the reflective polarizing layer has a polarization property sufficient in practical use when the ratio of the thickness of the multilayer dielectric film to the height of the convex ridges is 50% or less. The use of such a reflective polarizing layer provides a transflective liquid crystal display having high display quality.

What is claimed is:
1. A liquid crystal display, comprising:
  an upper substrate;
  a lower substrate facing the upper substrate;
  a liquid crystal layer disposed between the upper and lower substrates;
  an upper polarizing layer disposed above the liquid crystal layer; and a lower reflective polarizing layer disposed below the liquid crystal layer, the lower reflective polarizing layer having a plurality of convex ridges having a triangle wave shape in cross-section, and including a multilayer dielectric film consisting of a plurality of dielectric sub-layers, disposed over the convex ridges, a thickness of the multilayer dielectric film disposed on ridgelines of the convex ridges being less than or equal to 50% of the height of the convex ridges, and the height of the convex ridges being measured from a base of the triangle to an apex of the triangle.

2. The liquid crystal display according to claim 1, a base material film disposed above the lower substrate, the base material film forming the plurality of the convex ridges, and the multilayer dielectric film being disposed on the base material film.

3. The liquid crystal display according to claim 1, the number of the dielectric sub-layers being seven or less.

4. The liquid crystal display according to claim 1, further comprising a scattering film, disposed above the lower reflective polarizing layer, to scatter light reflected by the lower reflective polarizing layer.

5. The liquid crystal display according to claim 1, further comprising a color filter disposed at an inner side of the upper substrate or the lower substrate.

6. An electronic device, comprising:
the liquid crystal display according to claim 1.

* * * * *